(12) United States Patent
Radke

(10) Patent No.: US 6,209,936 B1
(45) Date of Patent: Apr. 3, 2001

(54) PANDROL TYPE PLATE-PLATE LIFTER

(75) Inventor: Albert James Radke, 455 Fairmont Ave., Fairmont, NE (US) 68354

(73) Assignee: Albert James Radke, Fairmont, NE (US)

( * ) Notice: Subject to any disclaimer, the term of this patent is extended or adjusted under 35 U.S.C. 154(b) by 0 days.

(21) Appl. No.: 09/472,272

(22) Filed: Dec. 27, 1999

(51) Int. Cl.⁷ .................. B65G 7/02; E01B 29/02
(52) U.S. Cl. ................ 294/17; 254/121; 254/131
(58) Field of Search ................... 294/15–17, 19.1, 294/26, 82.1, 82.11; 254/43, 44, 113, 119–121, 131

(56) References Cited

U.S. PATENT DOCUMENTS

| | | | |
|---|---|---|---|
| 124,749 | * | 3/1872 | Koontz ................................. 294/17 |
| 907,034 | * | 12/1908 | Gracey ................................. 294/17 |
| 978,618 | * | 12/1910 | Moore ................................. 254/121 |
| 1,297,453 | * | 3/1919 | Emmons et al. ..................... 254/121 |
| 1,317,145 | * | 9/1919 | Skantz ................................. 254/120 |
| 1,389,393 | * | 8/1921 | Stolle ................................... 254/43 |
| 1,590,145 | * | 6/1926 | Wright ................................. 254/121 |
| 1,695,660 | * | 12/1928 | Major et al. ........................ 254/121 |
| 2,156,735 | * | 5/1939 | Packer ................................. 254/121 |
| 2,837,313 | * | 6/1958 | Rogowski ............................ 254/121 |
| 2,846,259 | * | 8/1958 | Sadler ................................. 254/131 |
| 5,165,661 | * | 11/1992 | Wright ................................. 254/131 |

FOREIGN PATENT DOCUMENTS

27121 * 1/1955 (FI) ...................................... 254/120

* cited by examiner

*Primary Examiner*—Dean J. Kramer

(57) ABSTRACT

The invention relates to a hand held tool, for lifting a railway tie plate to the base of a railroad rail and holding the tie plate in position so tie plate will not move downward or laterally when railway workers install retainer clips that hold tie plate to the base of the rail. This tool will offer a safer and more efficient way to perform this task whether it is new or old construction.

2 Claims, 4 Drawing Sheets

PANDROL TYPE PLATE-PLATE LIFTER

BACKGROUND OF THE INVENTION

A railway maintenance tool.

This invention relates to the improved method of lifting a PANDROL type tie plate to the rail.

No references to specific documents which are related to the claimed invention that could be found in search.

When it is necessary to lift a PANDROL type tie plate to the rail base, the use of this tool can elevate the plate and hold it in place so the rail clips can be applied. Before the invention of this tool, the tie plate had to be held in place by hand or mounted on a tie and then tie and plate lifted into place under the rail by a completely different method.

This hand held tool works off the ball of the rail and incorporates a leverage system that when the upper part of the handle is lowered the lower part of the tool is elevated, thus raising the tie plate up to the base of the rail.

BRIEF SUMMARY OF THE INVENTION

The Pandrol type plate; plate lifter is designed to elevate a tie plate to the base of the rail. Before this, the plate had to be held in place by hand or mounted on a tie and then the tie and plate together had to be raised at the same time to the base of the rail. This hand held tool works off the ball of the rail and incorporates a leverage system that when the upper part of the tool handle is lowered, the lower part of the tool is elevated, thus raising the tie plate up to the base of the rail.

BRIEF DESCRIPTION OF THE DRAWINGS

In FIG. 1, the drawing shows the tool in what would be the working position setting on the ball of the rail.

In FIG. 1, the hooks numeral 4, are slid into the shoulders of the tie plate at oppsite corners from each other. At this time with tool base (bottom of numeral 1) resting on ball of rail, the handle is lowered and with chain and hooks attached to tie plate shoulders the tie plate is elevated to base of rail.

DETAILED DESCRIPTION OF THE INVENTION

Figure 1:
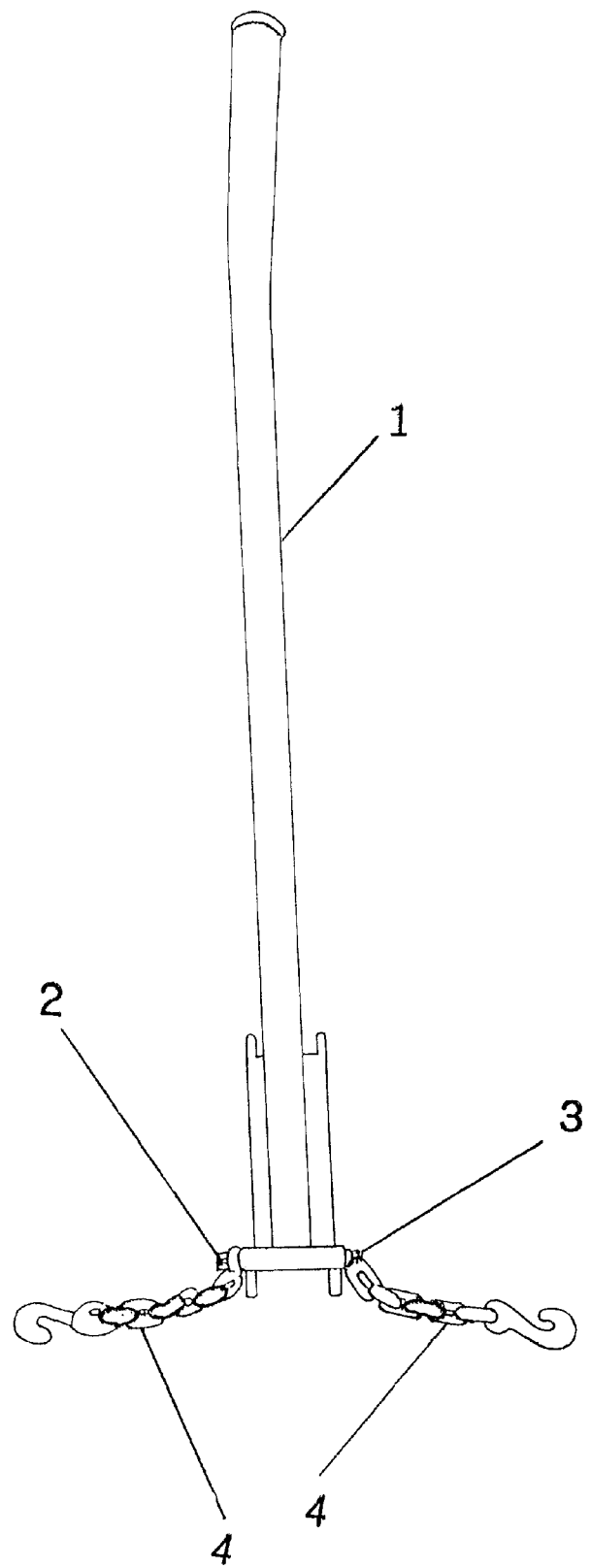
In FIG. 1. the Pandrol type plate; plate lifter is designated by a general reference numeral 1.
Figure 2:
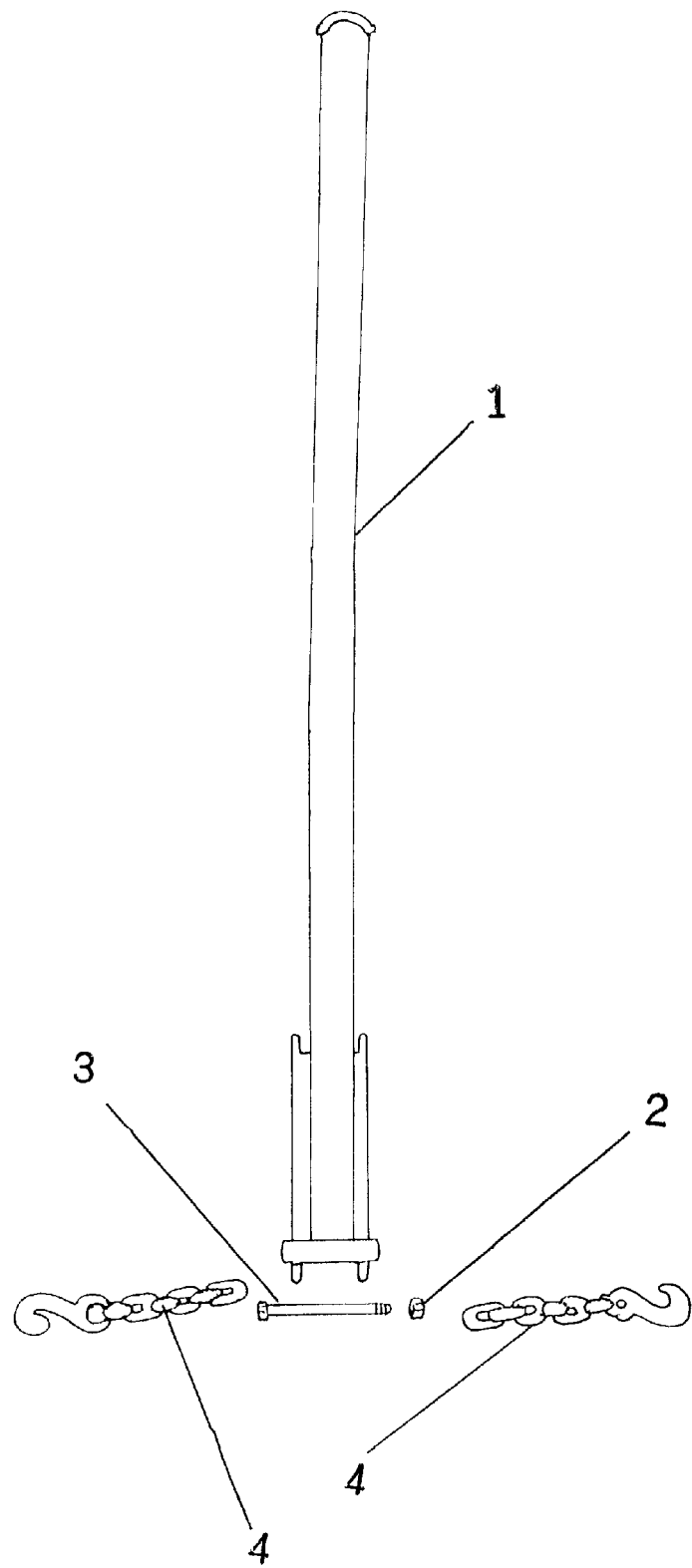
In FIG. 2, shown is a exploded of the five parts of the tool in which two of the parts are identical to each other. The handle-numeral 1, the bolt-numeral 3, the nut-numeral 2, and the hook with attached chains-numeral 4.
Figure 3:
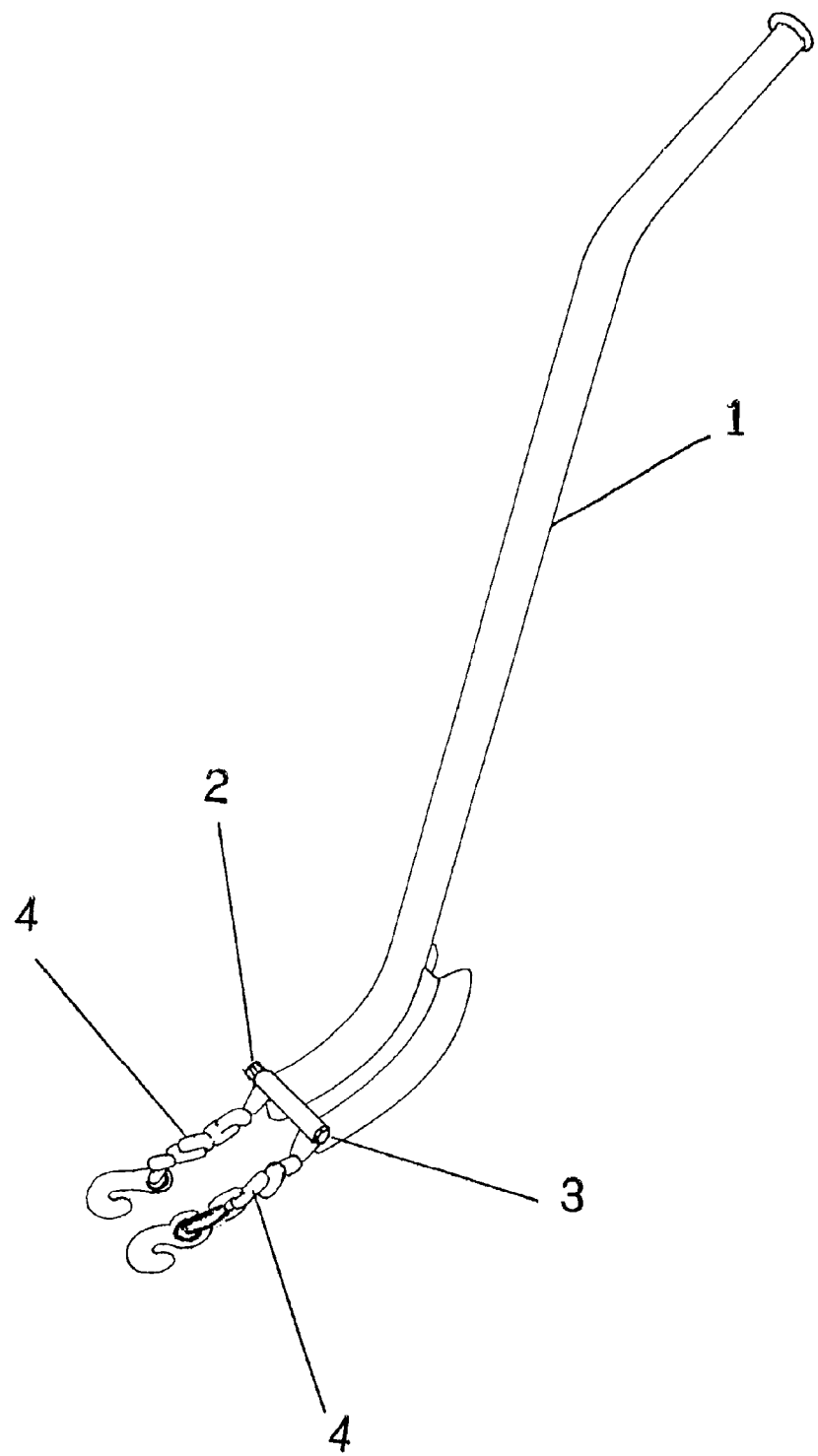
In FIG. 3, shown is a 45 degree front view of the tie plate lifting tool.
Figure 4:
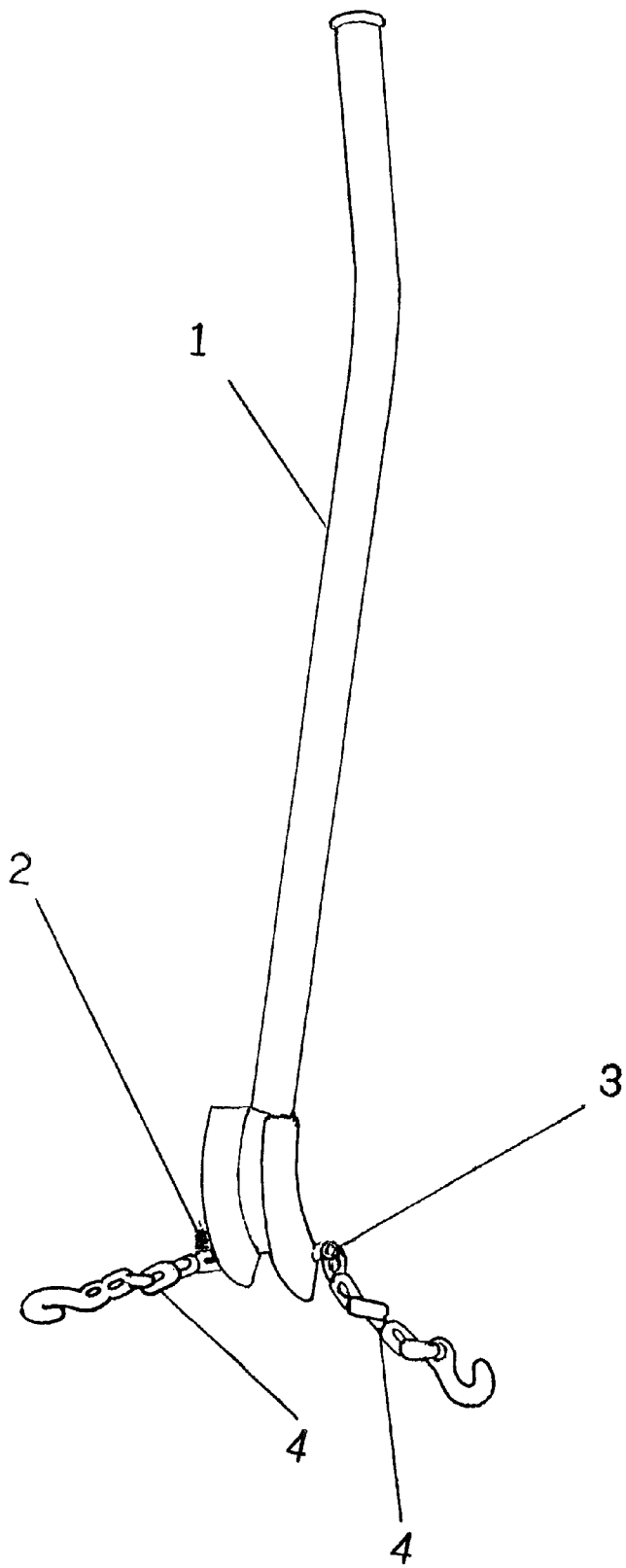
In FIG. 4, showen is a 45 degree rear view of the tie plate lifting tool.

Referring to Drawing FIG. 3

Numeral 1. The invention relates to a larger pipe or tubing bent on a 45 degree angle on the top end and a 45 degree angle on the bottom end. The angles are bent in opposite directions of each other. A steel ring is welded on the upper handle end to improve grip. The lower section of the tool consist of three pieces of strap iron. These pieces are welded together to form an open box or C channel, this is to prevent the tool from slipping off the head or ball of the rail. Before the C channel is welded together, it is bent and cut to follow the 45 degree curve at the bottom of the pipe or tubing. This C channel is then welded to the underside of the lower portion of the pipe or tubing.

Across the end of the pipe or tubing and on top of the C channel, there is a small piece of pipe or tubing welded in place. The purpose of this pipe is to retain the Numeral 3. bolt and the Numeral 2. nut. The purpose of the bolt and nut is to retain the Numeral 4. two chains. One chain on the left and one chain on the right. On the end of the chains are two hooks, one welded to the left chain and the other hook welded to the end of the right chain end.

DETAILED DESCRIPTION OF THE INVENTION

The hooks hook into the shoulder of the Pandrol type tie plate and when the upper part of the tool is lowered, the plate is elevated to the base of the rail.

No other invention to my knowledge to compare this tool.

What is claimed is:

1. A tool suitable for use in raising a pandrol-type tie plate; said tool having a pair of guide plates adapted to extend substantially parallel to and on opposite sides of a rail and a pair of chains with hooks, mounted with a bolt and nut to lower end of the tool; main tool body portion consisting of a pipe or tubing; said main tool body has an upwardly curved portion at lower end of tool and a downwardly curved portion at the upward end of tool; said tool is adapted to use a head of a rail for support and bearing member; said chains and hooks fashioned to extend downward beyond lower end of tool and engage a tie plate on opposite sides of the rail; such that moving an upper end of tool lower will facilitate in raising the plate to base of the rail.

2. A method of raising a pandrol-type tie plate to the base of rail comprising:
    (a) providing a tool having a pair of guide plates and a pair of chains with hooks mounted to a lower end of the tool;
    (b) placing the lower end of the tool on the head of rail such that the pair of guide plates extend substantially parallel to and on opposite sides of the rail;
    (c) attaching the hooks to shoulders of the tie plate on opposite sides of the rail; and
    (d) pressing downwardly on an upper end of the tool so that the lower end of the tool is elevated thereby lifting the tie plate towards the rail.

* * * * *